(12) United States Patent
Kallio et al.

(10) Patent No.: US 8,155,115 B2
(45) Date of Patent: Apr. 10, 2012

(54) METHOD, SYSTEM AND NETWORK ENTITY FOR INDICATING HIERARCHICAL MODE FOR TRANSPORT STREAMS CARRIED IN BROADBAND TRANSMISSION

(75) Inventors: Jarno Kallio, Turku (FI); Jani Vare, Kaarina (FI); Arto Hamara, Turku (FI)

(73) Assignee: Nokia Corporation, Espoo (FI)

( * ) Notice: Subject to any disclaimer, the term of this patent is extended or adjusted under 35 U.S.C. 154(b) by 1226 days.

(21) Appl. No.: 10/547,745

(22) PCT Filed: Mar. 3, 2003

(86) PCT No.: PCT/FI03/00155
§ 371 (c)(1),
(2), (4) Date: Jun. 20, 2006

(87) PCT Pub. No.: WO2004/080067
PCT Pub. Date: Sep. 16, 2004

(65) Prior Publication Data
US 2007/0091881 A1 Apr. 26, 2007

(51) Int. Cl.
*H04L 12/28* (2006.01)
*H04L 12/56* (2006.01)
*H04J 3/18* (2006.01)
*G08C 17/00* (2006.01)

(52) U.S. Cl. ........ 370/389; 370/311; 370/395; 370/477; 715/110

(58) Field of Classification Search .................. 370/466, 370/475, 444, 370, 389–401, 311–345; 709/216–250; 715/721; 725/38–110, 114–131; 455/343–574
See application file for complete search history.

(56) References Cited

U.S. PATENT DOCUMENTS

| 6,262,721 B1 | 7/2001 | Tsukidate et al. |
| 6,788,690 B2 * | 9/2004 | Harri ........................ 370/395.52 |
| 6,865,616 B1 * | 3/2005 | Adams et al. ................. 709/250 |
| 7,409,702 B2 * | 8/2008 | Cao ............................... 725/110 |
| 7,570,694 B2 * | 8/2009 | Le Goff ........................ 375/260 |

(Continued)

FOREIGN PATENT DOCUMENTS
EP 1049331 A1 11/2000
(Continued)

OTHER PUBLICATIONS

Office Action in European Patent Application No. 03708293.0-2202, dated Jan. 18, 2010.

(Continued)

*Primary Examiner* — Man Phan
(74) *Attorney, Agent, or Firm* — Banner & Witcoff, Ltd

(57) ABSTRACT

A method for transmission, a method for reception, a system, a transmitter and a receiver for signalling a hierarchical priority mapping of a transport stream (TS) to a receiver is disclosed. A way to separate tuning information between different TSs with different priorities. In a wireless hierarchical broadband transmission, preferably based on DVB-T, one signal may carry two transport streams: low priority (LP) stream and high priority (HP) stream, and both should be identified with their own respective transport_stream_id. One bit flag is added into a certain descriptor of the broadband transmission to indicate the hierarchy of the transport stream on which said descriptor is providing information. By the appliance of this priority indication or priority flag, the receiver can obtain hierarchy mapping of each transport stream announced in the administrative information of the broadband transmission.

27 Claims, 6 Drawing Sheets

U.S. PATENT DOCUMENTS

| | | | |
|---|---|---|---|
| 2002/0059630 A1* | 5/2002 | Salo et al. | 725/108 |
| 2002/0088005 A1* | 7/2002 | Wu et al. | 725/129 |
| 2002/0101933 A1 | 8/2002 | Ando | |
| 2003/0053344 A1* | 3/2003 | Herrmann | 365/200 |
| 2004/0001488 A1* | 1/2004 | Harri | 370/392 |
| 2005/0289592 A1* | 12/2005 | Vermola | 725/45 |
| 2006/0002389 A1* | 1/2006 | Lee | 370/389 |
| 2006/0013153 A1* | 1/2006 | Vare et al. | 370/311 |
| 2006/0212902 A1* | 9/2006 | Seo et al. | 725/39 |
| 2006/0258324 A1* | 11/2006 | Vare et al. | 455/343.3 |
| 2007/0280257 A1* | 12/2007 | Vare et al. | 370/395.3 |

FOREIGN PATENT DOCUMENTS

| | | |
|---|---|---|
| JP | 2001-069023 A | 3/2001 |
| JP | 2002-101141 A | 4/2002 |
| WO | WO 0225945 A1 | 3/2002 |
| WO | 02/082834 A1 | 10/2002 |
| WO | 03/069885 A2 | 8/2003 |

OTHER PUBLICATIONS

Japanese Office Action with English translation, mailed May 12, 2009, cited in corresponding Japanese application 2004-569029; 3 pages.

"Methods for transmitting data in digital television. Part 3", sections "DVB-T Concept", "Hierarchical Transmission", Interleaving and Forming Modulation Symbols in Hierarchical Transmission, magazine "625", No. 9, 1999 in Russian language.

"Digital Video Broadcasting. Fundamentals, Techniques, Systems"by Zubarev Y.B. et al., Moscow, Scientific Research Institute of Radio, 2001, p. 204-235—in Russian language.

"Terrestrial Digital Video Broadcasting (DVB-T)—Challenging Capabilities of the COFDM System"ny Gerard Faria. 2000.

English translation of Russian Office Action of Application Serial No. 2005130489/09 (034166), dated Mar. 27, 2007.

Notification of Second Office Action issued in Chinese Patent Application No. 03826083.2, dated Sep. 4, 2009.

Korean Office Action related to Korean Patent Application 7016428/2005.

Potential Benefits of Hierarchical Modes of the DVB-T Specification (Paper for IEE Colloquium) C.R. Nokes J.D. Mitchell BBC Research & Development.

Office Action in Canadian Patent Application No. 2,518,034, dated Dec. 15, 2010.

* cited by examiner

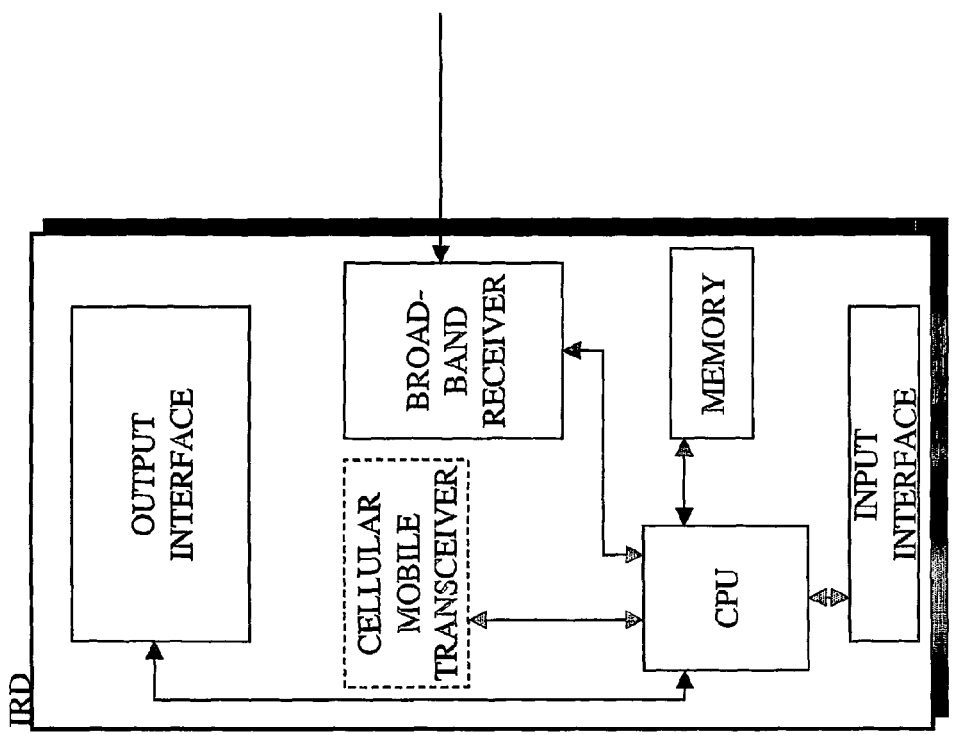

METHOD, SYSTEM AND NETWORK ENTITY FOR INDICATING HIERARCHICAL MODE FOR TRANSPORT STREAMS CARRIED IN BROADBAND TRANSMISSION

This application is a National Stage application of co-pending PCT application PCT/FI2003/000155 filed Mar. 3, 2003, which was published in English under PCT Article 21(2) on 16 Sep. 2004. This application is incorporated herein by reference in it entirety.

TECHNICAL FIELD OF THE INVENTION

This invention relates to systems, methods, and network entities for distributing data over a communication link.

BACKGROUND OF THE INVENTION

Broadcast has an almost century long tradition in radio. Even with TV, the history goes back to 1930's. Broadcasting has been successful throughout the world in bringing both entertainment and information to mass audiences.

The latest step in broadcasting is the digitalization of both radio and TV. Digital radio has not gained much acceptance on the market. However, many hope that digital TV will bring new benefits and services to the consumer and, as a result, generate new revenue streams for the broadcasting industry. The basic concept of the TV service itself has, however, not changed much. Rather, the TV lives on as before even if it has become digital.

In later half of 1990's we saw the boom of the Internet. A whole set of new services and content became available to the consumers during a short, revolutionary and hype intense period. That period introduced e-commerce, Internet Service Providers (ISPs), Portals, eyeballs game, dotcom companies and even the new economy. The developments in both access technologies (e.g. ADSL) and coding technologies (e.g. MPEG-4 streaming) have made it possible to bring rich media content like video content to homes via the Internet. Despite of these technology and market breakthroughs media houses have been reluctant to distribute their content via the Internet due to its "free-of-charge" nature and the direct threat of piracy. Neither has Internet been able to challenge the role of traditional media as the primary advertisement platform despite its great popularity.

Broadcast is a flexible system allowing broadcasters to choose from a variety of options to suit their various service environments. Broadly speaking the trade-off in one of service bit-rate versus signal robustness. In some cases this is solved by incorporating basically separate data transmissions into a single transmission by modulating the data in such a way that receivers with "good" reception conditions can receive both or all, while those with poorer reception conditions may only receive the one with more robust coding. A problem occurs when the receiver receives such a transmission, for example collects information on the existing signals announced. There is no distinction for such transmissions incorporated into the single transmission. On the basis of the parsed information, the receiver is only able to find the signal with more robust signal transmission. The other(s) transmission is completely unknown to the receiver. Thus, many services or parts of the transmitted services are not available, or even the worse case, they are not known at all. This has created a need to identify such transmissions.

In view of various inherent limitations of broadcasting, it would be desirable to avoid or mitigate these and other problems associated with prior art systems. Thus, there is a need for indicate a linkage between a transport stream and a hierarchical priority.

SUMMARY OF THE INVENTION

Now a method and arrangement have been invented to indicating a mapping between hierarchical priority mode and streams carried in the transmitted signal.

In accordance with aspects of the invention there is provided a method for reception, a method for transmission, a system, a transmitter and a receiver for a digital broadband transmission applying a hierarchical modulation. Information is provided how a hierarchical priority is adapted to be mapped to a transport stream carried in the digital broadband transmission in a digital broadband system For better understanding of the present invention reference is made to the following description, taken in conjunction with the accompanying drawings, and its scope will be pointed out in the appending claims.

BRIEF DESCRIPTION OF THE DRAWINGS

The invention will now be described, by way of example only, with reference to the accompanying drawings, in which:

FIG. 6 depicts a functional block diagram of a terminal for parsing how hierarchical priority maps into different transport streams in accordance with an embodiment of the invention.

DETAILED DESCRIPTION OF THE EMBODIMENTS

Figure 1:
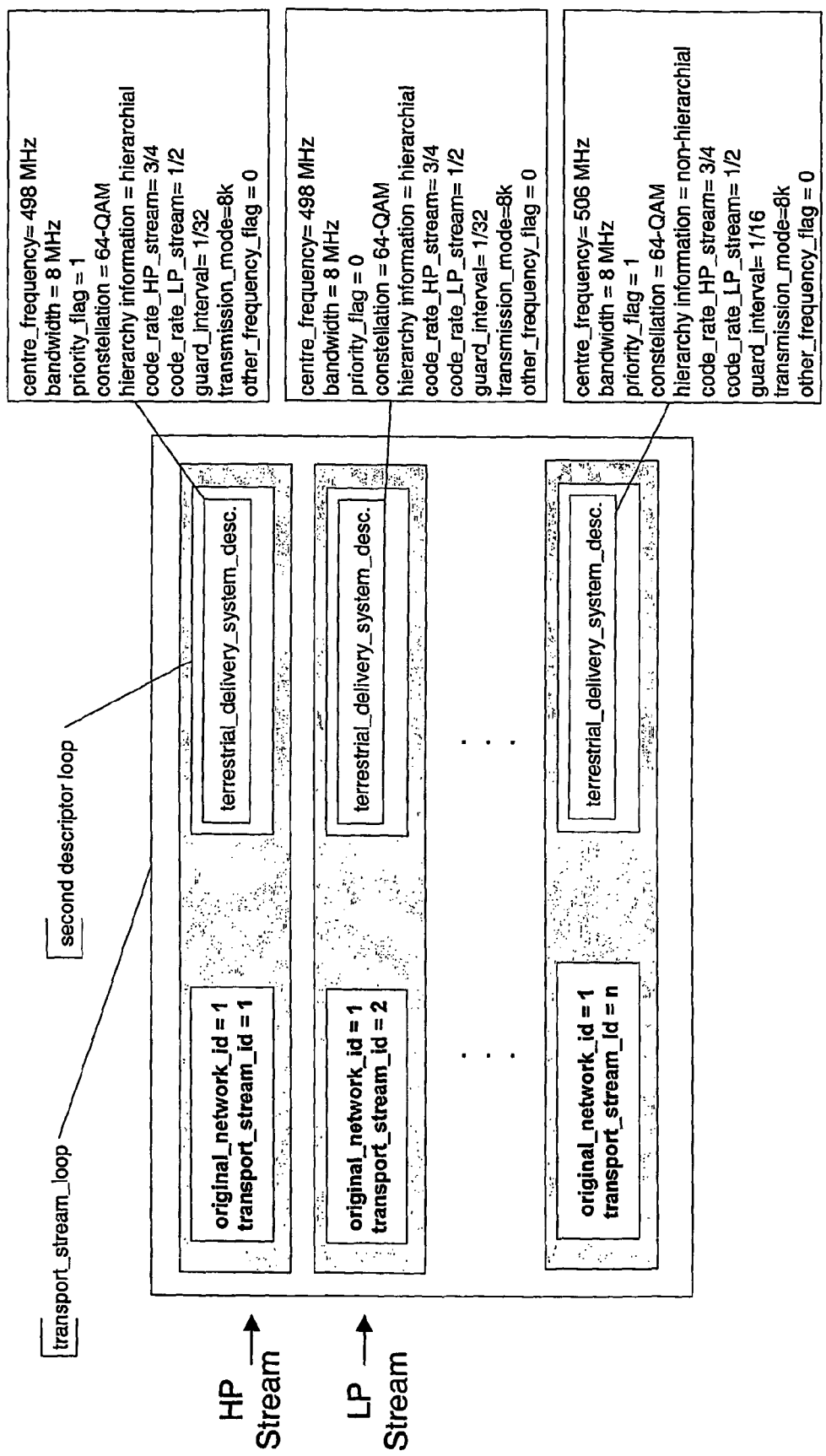
FIG. 1 shows an example on Network Information Table (NIT) mapping of transport streams into tuning parameters in accordance with an embodiment of the invention.

Digital Video Broadcasting (DVB) offers a high bandwidth broadband transmission channel wherein delivery is typically broadcast, multicast or alternatively unicast. The high bandwidth transmission channel can offer a user of such system various services. Identifications for obtaining the various services are necessary to focus on appropriate services models and receivers. DVB offers applicable principles, and preferably, a Terrestrial Digital Video Broadcasting (DVB-T) is applied in the embodied invention.

The digital broadband transmission provides a receiver device with huge amount of data information. A nature of the digital broadband transmission is that the transmission is streaming distribution typically to multiple receivers applying broadcast, multicast, or alternatively even unicast point-to-point distribution to a single receiver. The receiver device should be able to find the relevant data information among the huge amount of transmitted data information. The receiver device requires certain parameters in order to be able to receive the relevant service and/or portions of the service(s) which can be intended for or desired by the receiver device. Because the digital broadband transmission can distribute a lot of data, it can also distribute the parameters which enable the receiver device to discover the service and/or the portion of the service(s) among transmitted information. These parameters are transmitted by digitally broadband transmission to the receiver device. The receiver device recognizes them and can modify itself in accordance with the parameters. Therefore, the receiver device can now start receiving the service, by identifying the relevant data from the huge amount of data in the broadband transmission. A data distribution link of the broadband delivery can be a terrestrial link, preferably mobile or wireless terrestrial link. The digital broadband transmission system(s) may have an interaction with the receiver but the interaction is not a mandatory requirement.

As used herein, broadband transmission or transmission may refer to a broadcast, multicast, or unicast, and data can include but is not limited to, IP protocol-encoded data.

Preferable embodiments of the invention provide a method for transmission, a method for reception, a system, a transmitter and a receiver for signalling a hierarchical priority (e.g. HP or LP) mapping of the transport streams (TSs) carried within the signal to a receiver. The preferred embodiments provides a way to separate tuning information between different TSs with different priorities. In a wireless hierarchical broadband transmission, preferably based on DVB-T, one signal may carry two transport streams: low priority (LP) stream and high priority (HP) stream, and both should be identified with their own respective transport_stream_id. One bit flag is added into a certain descriptor of the broadband transmission to indicate the hierarchy of the transport stream on which said descriptor is providing information. By the appliance of this priority indication or priority flag, the receiver can obtain hierarchy mapping of each transport stream announced in the administrative information of the broadband transmission.

A further preferred embodiment provides an amendment for terrestrial_delivery_system descriptor by setting a field in the descriptor to signal the hierarchical priority (e.g. HP or LP) of the transport stream (TS), into which this descriptor is linked with. In the hierarchical broadband transmission, one signal may carry two transport streams (TSs): low priority (LP) stream and high priority (HP) stream. Both LP and HP streams should be identified with own transport_stream_id. This defection of how to map the transport_stream_id into a DVB-T stream, in the case where hierarchical transmission is used is, thus, overcome.

The further preferred embodiment proposes a solution for the mapping problem of the HP and LP streams by adding one bit flag to the terrestrial_delivery_system_descriptor. The bit flag indicates the hierarchical priority of the transport stream (TS), from which the associated descriptor is providing information about. By the means of this 'priority_flag', integrated receiver device (IRD) can obtain the hierarchy mapping of the each transport stream (TS) announced in NIT.

Advantageously, transport_stream_id:s can be linked with DVB-T hierarchical mode streams, for example TSs with low priority (LP) or high priority (HP). The embodied invention can be considered compatible with existing DVB-T receivers. This is mainly because the embodied invention utilizes 'reserved for future use' bits in the terrestrial_delivery_system descriptor and, thus, doesn't set any limitations for already existing equipment.

Some embodiments of the invention apply the hierarchical modulation. An exemplary environment for the hierarchical modulation can be DVB-T. The hierarchical broadband transmission comprises at least two different Transport Streams (TSs) with different priorities. In the hierarchical modulation, two separate data streams are modulated onto a single DVB-T signal. One DVB-T stream then comprises one "High Priority" (HP) stream and one "Low Priority" (LP) stream. Receivers with "good" reception conditions can receive both streams, while those with poorer reception conditions may only receive the "High Priority" stream. Broadcasters can target two different types of DVB-T receiver with two completely different services. Typically, the LP stream is of higher bit rate, but lower robustness than the HP one. The hierarchical broadband transmission is particularly relevant in mobile or portable reception. Advantageously, the LP stream and the HP stream can be indicated with a flag contained in the descriptor identifying the priority of the streams (high or low) and the correspondence with the transport stream at issue. Therefore, the receiver is able to identify, and possibly separate the streams of the hierarchical broadband transmission. The receiver can separate tuning information between the transport streams (TSs) with different priorities. As used herein, the hierarchical priority may refer to streams with more than specifically two priority values or characteristics, and can include various priorities but is not limited to the low priority and the high priority.

Some embodiments of the invention apply Program Specific Information (PSI) and Service Information (SI) Tables. PSI and SI form a set of tables used as an additional structure in MPEG-2 transmission. PSI is defined in the MPEG-2 Systems standard ISO/IEC 13818-1 and SI in the DVB Specification for Service Information (SI) ETSI EN 300 468. These tables are used to deliver different information on the services conveyed in MPEG-2 transmission.

MPEG-2 transmission is controlled by the System Layer, which provides the information required for multiplexing and demultiplexing the data. This information may include Program Specific Information (PSI) tables, which act as a table of contents for all the services carried in MPEG-2 transmission. Furthermore, DVB organization has defined, that any network supporting DVB standard, should in minimum, use certain SI tables in their transmission. An example of such a table is a Network Information Table (NIT).

Some embodiments of the invention apply the Network Information Table (NIT). NIT provides a grouping of TSs and the relevant tuning information. NIT could be used during set-up procedures of the Integrated Receiver Device (IRD) and the relevant tuning information may be stored in non-volatile memory. The NIT also could be used to signal changes of tuning information. The following rules apply to the NIT in an embodied invention:

a) The actual delivery system transmits NIT;
b) the NIT describing the actual delivery system can be considered valid, for example, if it contains applicable delivery system descriptors for the actual delivery system. At some transitions of broadcast delivery system boundaries, the NIT carried in a TS is allowed to describe an earlier network in the broadcast chain. A different mechanism should be selected by the IRD to obtain the relevant tuning information for the actual delivery system. For example, if a satellite IRD receives a satellite delivery system descriptor for the actual delivery system, then it is valid. If a cable IRD receives a cable delivery system descriptor for the actual delivery system, then it is valid. If a cable IRD receives a satellite delivery system descriptor for the actual delivery system, then it is assumed to be invalid for the cable IRD;
c) if a valid NIT for the actual delivery system is present in the SI bit stream then it typically lists all TSs of the actual delivery system;

d) the SI stream has at least 8 TS packets per 10 seconds carrying NIT data or NULL packets. This rule simplifies the replacement of the NIT at broadcast delivery system boundaries. With the simple replacement mechanism, local frequency control is possible with relatively low cost equipment.

The SI uses two labels related to the concept of a delivery system, namely the network_id and the original_network_id. The latter is mainly intended to support the unique identification of a service, contained in a TS, even if that TS has been transferred to another delivery system than the delivery system where it originated.

A TS can be uniquely referenced through the path original_network_id/transport_stream_id. A service can be uniquely referenced through the path original_network_id/transport_stream_id/service_id. The network_id, thus, may not be a part of this path. In addition, each service_id should be unique within each original_network_id. When a service (contained inside a TS) is transferred to another delivery system, only the network_id changes, whereas the original_network_id remains unaffected. More technical details on NIT can be found from the standard specification ETSI EN 300 468, for example on page 17 of Final draft ETSI EN 300 468 V1.5.1 (2003-01).

Some embodiments of the invention apply descriptors. The descriptors can be alternatively referred to as identifiers or indicators by their functionalities in the broadband transmission. DVB standards define several descriptors, which are additional fields in the PSI/SI tables that are used for announcing information to the receivers. The standard specifications: EN 300 468—Digital Video Broadcasting (DVB); Specification for Service Information (SI) in DVB systems and ETSI TR 101 211—Digital Video Broadcasting (DVB); Guidelines on implementation and usage of Service Information (SI) provide more technical details on the descriptors. An example of the descriptor is Terrestrial_delivery_system_descriptor.

Delivery system descriptors are the satellite_delivery_system_descriptor, cable_delivery_system descriptor and the terrestrial_delivery_system_descriptor. Descriptors for other delivery systems may be defined. The delivery system descriptors are used to transmit the physical parameters for each transport multiplex in the network. Typically, one (and only one) delivery system descriptor appears in each loop. IRDs shall be able to interpret the delivery system descriptor in order to tune to TSs quickly. More technical details can be found from a standard specification TR 101 211, for example, on sub-clauses 4.1.1 and 5.3.1.

It should be noted that some descriptors or identifiers can be referred to by underline character in the technical specifications, for example, a terrestrial delivery system descriptor by terrestrial_delivery_system_descriptor.

Yet further embodiment of the invention applying NIT table and terrestrial_delivery_system_descriptor is provided next. A support for mapping of the single DVB-T transport stream (default case) can be found in EN 300 468. However, when DVB-T network is using the hierarchical mode the problem arises so that it can only map one transport stream to the RF-channel as opposed to the principle that the hierarchical mode preferably contains two transport streams. This leads to a situation, where the IRD cannot know whether the transport_stream_id announced in NIT belongs to a LP stream or to a HP stream.

An underlying table 1 shows an example of the structure of the NIT table. Terrestrial_delivery_system_descriptor, exemplary illustrated in an underlying Table 2 (as on page 44 in the Final draft ETSI EN 300 468 V1.5.1 (2003-01)), is carried in the second descriptor loop of NIT. Terrestrial_delivery_system_descriptor is referred to in the second descriptor loop of NIT, which is highlighted in the table.

TABLE 1

An example of Network Information Table (NIT).

| Syntax | No. of bits | Identifier |
|---|---|---|
| network_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     network_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriptors_length | 12 | uimsbf |
|     for(i=0;i<N;i++){ | | |
|         descriptor( ) | | |
|     } | | |
|     reserved_future_use | 4 | bslbf |
|     transport_stream_loop_length | 12 | uimsbf |
|     for(i=0;i<N;i++){ | | |
|         transport_stream_id | 16 | uimsbf |
|         original_network_id | 16 | uimsbf |
|         reserved_future_use | 4 | bslbf |
|         transport_descriptors_length | 12 | uimsbf |
|         for(j=0;j<N;j++){ | | |
|             descriptor( ) | | |
|         } | | |
|     } | | |
|     CRC_32 | 32 | rpchof |
| } | | |

One bit, preferably named as an priority_flag, see text highlighted in the example of Table 2, from the first 'reserved for future use' field is modified and set to indicate whether the transport stream associated with this descriptor has the low priority (LP) or the high priority (HP). This signalling format is in more detail illustrated in the example of table 3.

TABLE 2

An example of terrestrial delivery system descriptor.

| Syntax | No. of bits | Identifier |
|---|---|---|
| terrestrial_delivery_system_descriptor(){ | | |
|     descriptor_tag | 8 | uimsbf |
|     descriptor_length | 8 | uimsbf |
|     centre_frequency | 32 | bslbf |
|     Bandwidth | 3 | bslbf |
|     reserved_future_use | 4 | bslbf |
|     priority_flag | 1 | bslbf |
|     Constellation | 2 | bslbf |
|     hierarchy_information | 3 | bslbf |
|     code_rate-HP_stream | 3 | bslbf |
|     code_rate-LP_stream | 3 | bslbf |
|     guard_interval | 2 | bslbf |
|     Transmission_mode | 2 | bslbf |
|     other_frequency_flag | 1 | bslbf |
|     reserved_future_use | 32 | bslbf |
| } | | |

TABLE 3

An example of signalling format for the priority.

| priority_flag | priority value |
|---|---|
| 1 | HP |
| 0 | LP |

In the following, yet another further embodiments are described applying the mapping of the transport_stream_id into the priority of such streams, and the parsing of NIT and the priority parameters in hierarchy based broadband data transmission reception.

FIG. 1 shows an example of NIT table mapping of the transport stream into tuning parameters and hierarchy information referred by NIT. Thus, an example how NIT maps transport streams with tuning parameters and a priority_flag is depicted. TSs can be indicated by original_network_id and transport_stream_id pairs. The TSs are announced in the transport stream loop of NIT. The tuning parameters and priority_flag is announced in the terrestrial_delivery_system_ descriptor. The two firstly announced transport streams (TSs) are carried within the same signal (Centre frequency 498 MHz). In the example, the only differences between these transport streams are the values of hierarchical priority and transport_stream_id. The first one (transport_stream_id=1) is a High Priority (HP) transport stream. This is shown in the FIG. 1 in that the value of the priority_flag is set to 1. The second one (transport_stream_id=2) is a Low Priority (LP) transport stream. This is shown in the FIG. 1 in that the value of the priority_flag is set to 0.

Still referring to the example of FIG. 1, by adding the priority_flag in the terrestrial_delivery_system_descriptor, transport streams announced in NIT are mapped also with their corresponding hierarchy information.

Figure 2:
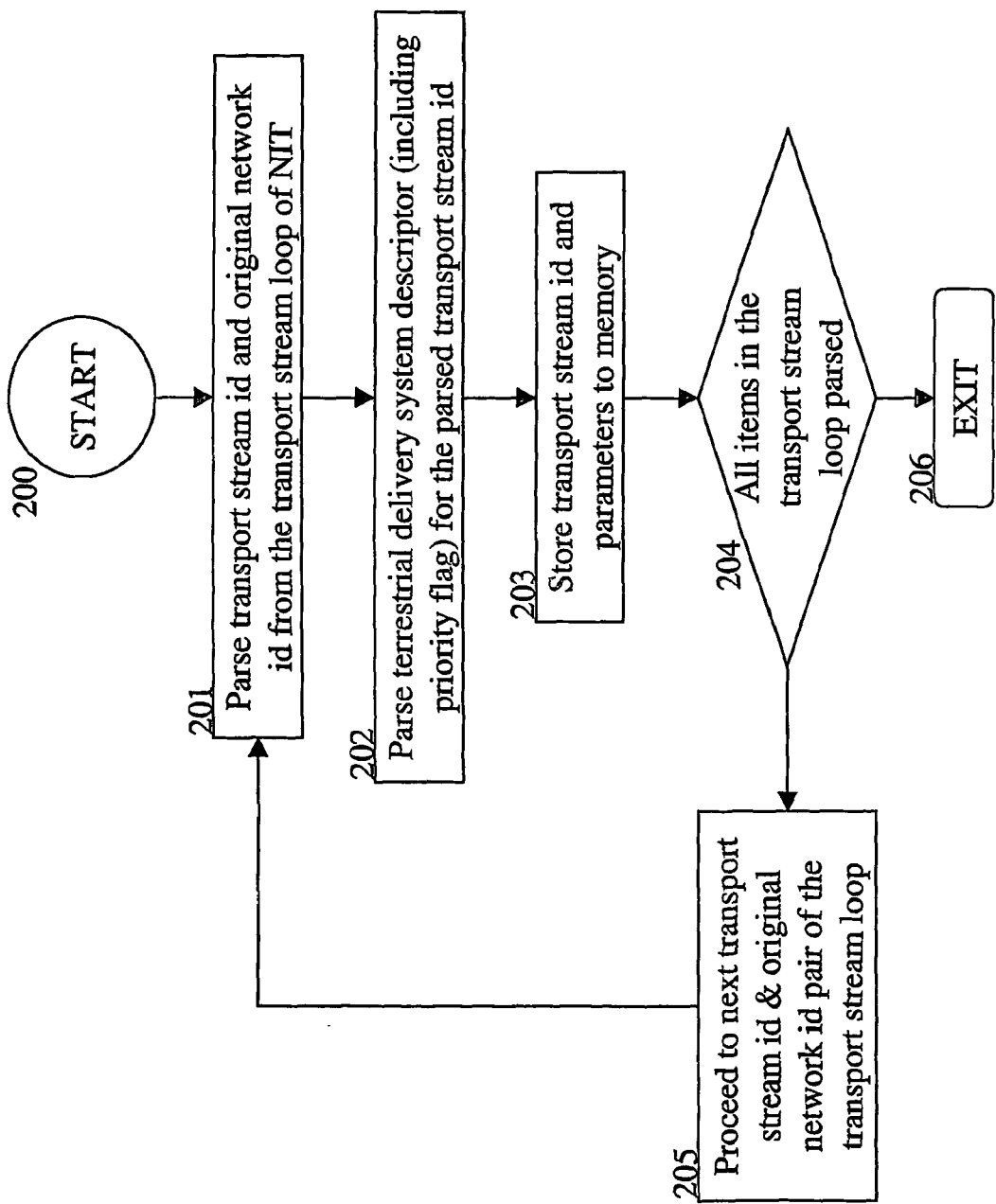
FIG. 2 depicts in a form of a flowchart a method for parsing NIT and priority parameters in accordance with an embodiment of the invention.

The example of FIG. 2 illustrates a method for parsing NIT and parameters in accordance with a further embodiment of the invention. The process starts in step 200. A Digital Broadband Network (DBN) is operating and IRD is switched on for receiving the broadband transmission. IRD identifies some PSI/SI tables and, therefore, obtains information on the announced transport streams. The IRD receives and identifies NIT. In step 201 IRD parses transport_stream_id and original_network_id from the transport stream loop of NIT. IRD finds also the terrestrial_delivery_system_descriptor referred to in NIT. In step 202 IRD parses terrestrial_delivery_system_descriptor for the parsed transport_stream_id. The terrestrial_delivery_system_descriptor includes the priority_flag. In step 203 IRD stores transport_stream_id parsed in the step 201 and the parameters parsed in step 202. Therefore, transport_stream_id and original_network_id is mapped into the tuning parameters and hierarchy information, and they can be stored to the memory of IRD. In step 204 there is being checked whether all items in the transport stream loop are parsed. If not, the process proceeds to next transport stream_id & original_network_id pair of the transport stream loop of NIT in step 205. Thus, the steps of 201-204 can be performed to all transport_stream_id & original_network_id pairs of the transport stream loop of NIT. If all relevant items in the transport stream loop are parsed, the process ends in step 206. Advantageously, IRD obtains knowledge how to identify the transport streams with different priority in hierarchical transmission. Advantageously, IRD can also separate the priority streams from one another.

Figure 3:
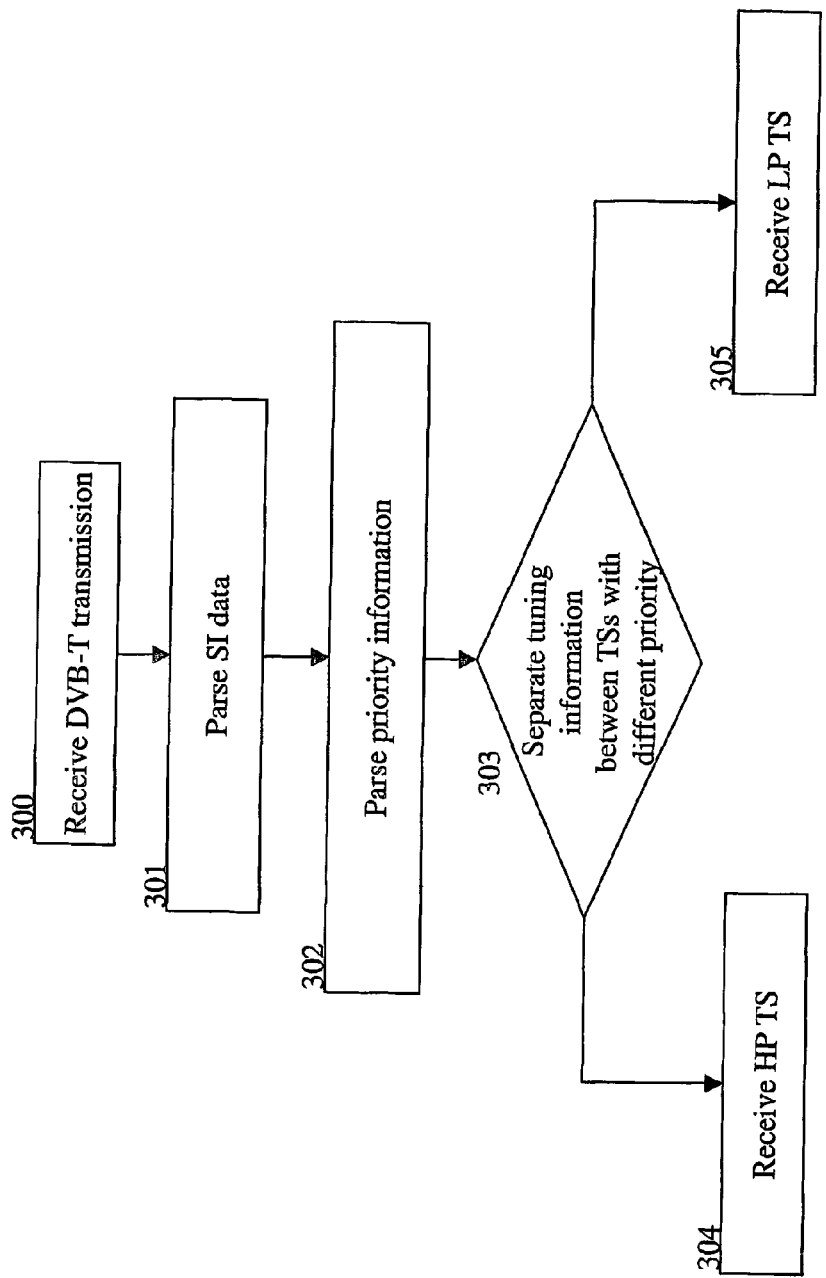
FIG. 3 depicts in a form of a flowchart a method for separating tuning information between transport streams with different priorities in accordance with an embodiment of the invention.

The example of FIG. 3 depicts a method for separating tuning information between TSs with different priorities. The process starts in step 300. Digital Broadband Network (DBN) is operating and IRD is switched on for receiving the DVB-T hierarchical broadband transmission. IRD identifies some PSI/SI tables and, therefore, obtains information on the announced transport streams. The IRD receives and identifies NIT. In step 301 IRD parses SI data. IRD parses transport_stream_id and original_network_id from the transport stream loop of NIT. IRD finds also the terrestrial_delivery_system_ descriptor referred to in NIT. In step 302 IRD parses priority information. IRD parses terrestrial_delivery_system_descriptor for the parsed transport_stream_id. The terrestrial_delivery_system_descriptor includes the priority_flag. In step 303 IRD can separate tuning information between TSs with different priority. IRD stores transport_stream_id parsed in the step 301 and the parameter parsed in step 302. Therefore, transport_stream_id and original_network_id mapped into the tuning parameters and hierarchy information, and the mapping can be stored to the memory of IRD. Preferably, there is being checked whether all items in the transport stream loop are parsed. Thus, the steps of 301-302 can be performed to all transport_stream_id & original_network_id pairs of the transport stream loop of NIT. Advantageously, IRD obtains knowledge how to identify the transport streams with different priority in hierarchical broadband transmission. Advantageously, IRD can also separate the priority streams from one another. In step 304 IRD can receive HP TS. Thus, if needed IRD can focus only on high priority stream. This may be relevant if the transmission conditions are not "good", for example, interference occurs in the reception of DVB-T. In step 305 IRD can receive LP TS. Thus, if needed IRD can focus only on low priority stream. This is advantageous since even though LP TS can be more difficult to receive than HP TS, based on the indication and identification LP may be available to IRD. Even if reception conditions are poorer or "not so good", and some interference occurs in the reception, at least information that the hierarchical DVB-T transmission has LP TS is obtained. In severe condition LP TS can have some interference. Additionally, both HP an LP TS can be received by the IRD.

Figure 4:
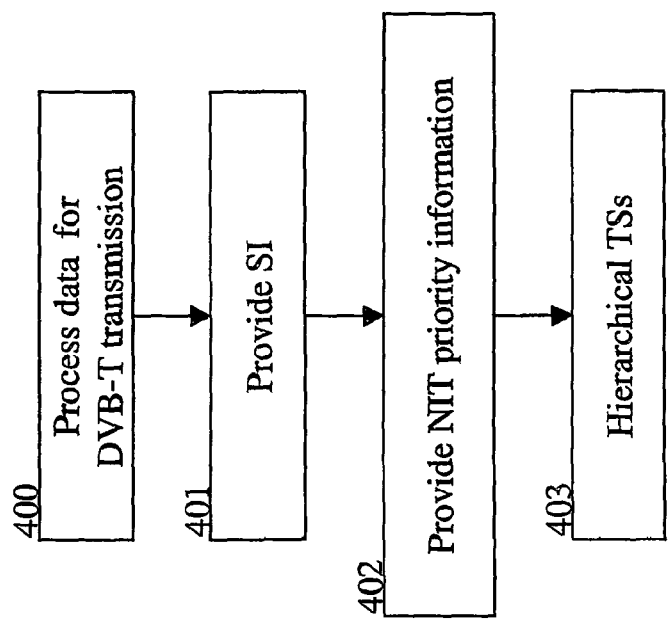
FIG. 4 depicts in a form of a flowchart a method for indicating how hierarchical priority maps into a transport stream in hierarchical broadband transmission in accordance with an embodiment of the invention

The example of FIG. 4 depicts a method for indicating how hierarchical priority maps into a transport stream in hierarchical broadband transmission. In step 400 DBN is operating and process service data for DVB-T transmission. In step 401 the DBN provides the SI/PSI data. The terrestrial_delivery_ system_descriptor with the priority_flag information is contained in the PSI/SI tables in the second descriptor loop of NIT. Thus, NIT priority information is provided in step 402. The DBN transmits also HP and LP TSs in step 403. Based on the descriptor the DBN is able to categorise hierarchical streams for high and low priority streams and, moreover, is able to show or indicate the categorisation. Especially, the IRD can discover LP streams even though the reception conditions are not optimum.

Figure 5:
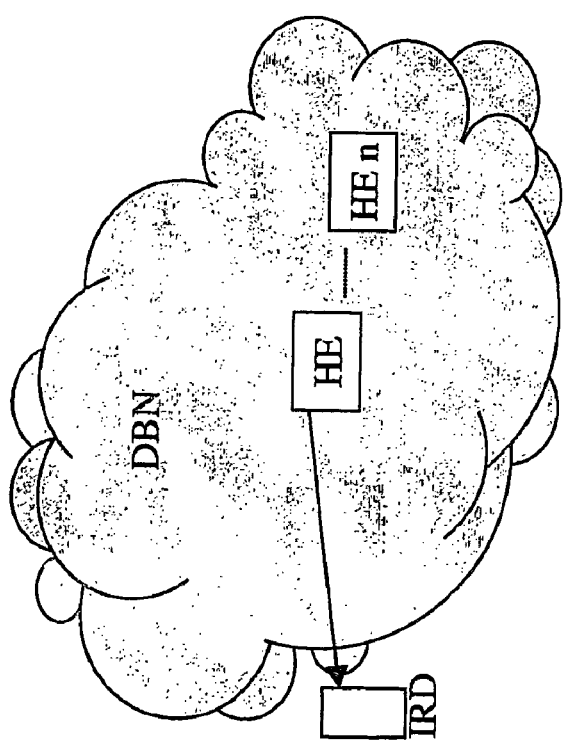
FIG. 5 shows a general architecture of the system where principles of an embodied invention can be applied.

Some embodiments of the invention apply the system of FIG. 5. The network of FIG. 5 can be configured to transmit the terrestrial_delivery_system_descriptor to correspond the announcement of the hierarchical priority mapping of the TS in the hierarchical broadband transmission. The Integrated Receiver Device (IRD) operates preferably under coverage of the Digital Broadcast Network (DBN). Alternatively, IRD can be referred to as End User Terminal (EUT). IRD can be capable of receiving IP based services that DBN is providing. The DBN is based on DVB, preferably DVB-T, and the transmission of the DBN contains TSs based on the hierarchical transmission modulation. The transmission is also preferably wireless broadband transmission. Before transmission data is processed in the DBN. The DBN comprises means for modifying the transmission that it is transmitting. The DBN provides the SI/PSI data. The terrestrial_delivery_system_descriptor with the priority_flag information is contained in the PSI/SI tables in the second descriptor loop of NIT. Thus, NIT priority information is provided. The DBN transmits also HP and LP TSs. Based on the descriptor the DBN is able to categorise hierarchical streams for high and low priority streams and, moreover, is able to show or indicate the categorisation. Especially, the IRD can discover LP streams even though the reception conditions are not optimum. IRD can identify the hierarchical priority of each TS carried in the digital broadband transmission. IRD does not necessary need to be beforehand modified to interpret such descriptor and such transmission but of the receiver may adapt or be adapted to it while receiving the broadcast transmission. The IRD does not require any interaction for the identifying and for the mapping procedure. Preferably, the DBN transmission is wireless or mobile transmission to the IRD based on DVB-T. Thus, data can be transferred wirelessly.

Still referring to the example of FIG. 4, headends (HE)s containing IP encapsulators perform a multi-protocol encapsulation (MPE) and places the IP data into Moving Picture Experts Group—Transport Stream (MPEG—TS) based data containers. The HEs perform the generation of the tables, the linking of the tables and the modification of the tables.

The TSs so produced are transmitted over the DVB-T data link. The IRD receives digitally broadcast data. The IRD receives the descriptor and also the TSs in accordance with the hierarchical broadband transmission and possibly other TSs. The IRD is able to identify the TSs having the priority indication. Thus, the DBN has signalled the priority of the TS of hierarchical transmission. IRD parses transport_stream_id from received NIT. The IRD is able to separate TSs with different priority. Also IRD can categorise the TSs based on their hierarchical priority. Moreover, IRD is able to map hierarchical priority into TSs, for example, information on how transport_stream_id and original_network_id is mapped into the tuning parameters and hierarchy information. The mapping result can be stored into the memory of IRD. Further operations are described in the above examples of FIGS. 1-4, and tables 1-3.

An example of FIG. 6 depicts a functional block diagram of the Integrated Receiver Device (IRD) or alternatively referred to as a receiver or a End User Terminal (EUT). The IRD receiver can be decoded to correspond with the terrestrial_delivery_system_descriptor. The IRD comprises a processing unit CPU, a broadband receiver part or alternatively referred to as a multi-carrier signal receiver part, which can receive, for example, a multi-carrier broadband signal such as DVB-T signal, and a user interface UI. The broadband receiver part and the user interface UI are coupled with the processing unit CPU. The user interface UI comprises a display and a keyboard to enable a user to use the receiver. In addition, the user interface UI comprises a microphone and a speaker for receiving and producing audio signals. The user interface UI may also comprise voice recognition (not shown). The processing unit CPU comprises a microprocessor (not shown), memory and possibly software SW (not shown). The software SW can be stored in the memory. The microprocessor controls, on the basis of the software SW, the operation of the receiver, such as, identification of hierarchical priority of TS, linking the hierarchical priority with certain TS, separation of TSs with different priorities, displaying output in the user interface UI and the reading of inputs received from the user interface UI. The operations are described in the above examples of FIGS. 1-5, and tables 1-3. For example, the hardware (not shown) comprises means for detecting the signal, means for demodulation, means for detecting the NIT, means for detecting terrestrial_delivery_system_descriptor, means for parsing transport_stream_id and original_network_id, means for parsing terrestrial_delivery_system_descriptor including the priority_flag for the parsed transport_stream_id, means for mapping transport_stream_id and original_network_id with the tuning parameters and with hierarchy information, and means for storing information into the memory. Even if the broadcasted service are changing dynamically, and IRD has to rely on the information announced in the NIT, IRD can beneficially separate tuning information between TSs with different priorities.

Still referring to FIG. 6, alternatively, middleware or software implementation can be applied (not shown). The IRD can be a hand-held device which the user can comfortably carry. Advantageously, IRD can comprise a cellular mobile phone which comprises the broadcast receiver or multi-carrier signal receiver part for receiving the DVB-T broadcast transmission streams (this is shown in the FIG. 6 by a dash line block which, thus, is an alternative option only). Therefore, the EUT may possibly interact with the service providers.

Advantageously, no additional time for parsing additional tables to provide HP/LP mapping by other means is required. Neither a time consuming signal scan for every possible tuning combination that could be iterated in a possible frequency range, for example UHF, is required.

The receiver can beneficially focus on those streams of the hierarchical DVB-T transmission to which the receiver wishes to focus on. Thus, LP streams are not ignored but at least could be identified. A promotion to the power consumption aspect is also achieved by avoiding any additional frequency scans or parsing of the received DVB-T transmission, which contribute the mobility aspect of the DVB-T receiver. The receiver only needs to be able to interpret defined descriptor by applying equivalent means as it is used to receive and identify other descriptors of the digital broadcasting.

Some embodiments of the invention supports portable reception, for example in IP datacast receivers, and can, possibly, work for mobile hand held receivers or terminals. The indication of the mapping of the transport stream with the hierarchical priority information is beneficial in this case. Typically, the mobile DVB-T receivers suffers from power consumption aspects. Moreover, the reception conditions vary and some interference will typically occur is the broadband transmission interfering the mobile reception. Therefore, the hierarchical modulation can be advantageous in mobile environment since at least certain important streams could be delivered. Beneficially, in the hierarchical broadband transmission the streams can be advantageously shown to the receiver, and the mobile receiver, being vulnerable to the power consumption, can identify the streams of the hierarchical broadband transmission. The mobile receiver does not have to perform any power consuming operation such as additional scanning of frequencies, additional scanning of streams or additional scanning of generally the parameters of the streams. Also any additional parsing, consuming the power of the receiver, can be avoided since the initial reception and the following initial parsing sequence can be based on a single basic broadcast reception.

The performance of the embodiments boosts benefits of the invention such as economy. For example, DVB-T offers an effective and cheap way to distribute data, and the embodiments promote the less power consumption reception way for broadcast data stream even when operating partly along with non-power consumption based broadcast system.

In yet further embodiment of the invention, a way to indicate the separation of HP/LP stream is described. Also, this provides the way to signal the mapping of hierarchical priority mode into and the transport stream. The digital broadband network system or an operator of such a system announces the transport streams in the NIT in a certain order. For example, first there is announced a HP TS for the frequency and multiplex at issue. Next, an LP TS is announced for the frequency and the multiplex at issue. Thus, NIT is adapted to announce the TSs in the certain order where a certain position in the order is agreed to mean a degree of priority.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims. Consequently, the options of implementing the invention as determined by the claims, including the equivalents, also belong to the scope of the present invention.

The invention claimed is:

1. A method, comprising:
transmitting a digital broadcast transmission applying a hierarchical modulation,
transmitting a signaling table comprising a descriptor of the digital broadcast transmission, wherein said descriptor is configured to indicate how a hierarchical priority is configured to be mapped to a transport stream carried in said digital broadcast transmission,
providing information on how said hierarchical priority is configured to be mapped to said transport stream carried in said digital broadcast transmission,
providing information identifying said transport stream for parsing at a receiver,
providing information identifying said hierarchical priority for parsing at said receiver, and
linking the information identifying said transport stream and the information identifying said hierarchical priority so as to map said transport stream into said priority,
wherein said signaling table is configured to identify said transport stream, and said descriptor is configured to identify said hierarchical priority of said transport stream so that said hierarchical priority of said transport stream can be identified at said receiver so as to select the transport stream in accordance with said hierarchical priority.

2. The method according to claim 1, wherein the method further comprises separating said transport stream from a second transport stream of said digital broadcast transmission, said second transport stream comprising a different priority, based on the priorities.

3. The method according to claim 1, wherein said hierarchical priority indicates whether said transport stream comprises a low priority or a high priority, the high and low priorities being based on a hierarchical addition of information to a signal of said digital broadcast transmission.

4. The method according to claim 1, wherein said descriptor comprises a terrestrial delivery system descriptor.

5. The method according to claim 4, wherein a priority flag of said terrestrial delivery system descriptor identifies said hierarchical priority.

6. The method according to claim 1, wherein a transport stream id and an original network id uniquely identify said transport stream.

7. The method according to claim 1, wherein at least two data streams are configured to be modulated onto the digital broadcast transmission.

8. The method according to claim 7, wherein said two data streams comprise a high priority stream and a low priority stream.

9. The method according to claim 8, wherein said high priority stream contains higher robustness than said low priority stream.

10. The method according to claim 8, wherein said low priority stream contains higher bit-rate encoding than said high priority stream.

11. The method according to claim 1, wherein the digital broadcast transmission comprises a multi-carrier signal transmission.

12. The method according to claim 1, wherein the digital broadcast transmission comprises Digital Video Broadcasting (DVB) transmission.

13. The method according to claim 12, wherein the DVB transmission comprises a DVB-T transmission.

14. The method according to claim 1, wherein the digital broadcast transmission comprises a wireless digital broadband transmission.

15. The method according to claim 14, wherein the wireless digital broadcast transmission comprises a DVB-T transmission for mobile reception.

16. A method, comprising:
receiving a digital broadcast transmission applying a hierarchical modulation,
receiving a network information table comprising a descriptor of the digital broadcast transmission, wherein said descriptor is configured to indicate how a hierarchical priority is configured to be mapped to a transport stream carried in said digital broadcast transmission,
obtaining information on how said hierarchical priority is configured to be mapped to said transport stream carried in said digital broadcast transmission,
wherein said network information table is configured to identify said transport stream, and said descriptor is configured to identify said hierarchical priority of said transport stream so that said hierarchical priority of said transport stream can be identified,
identifying said hierarchical priority, and
selecting the transport stream in accordance with said hierarchical priority
wherein said descriptor comprises a bit flag indicating a value of said hierarchical priority, and
wherein said bit flag is contained in service information of said digital broadcast transmission, and
wherein said service information comprises the network information table and said bit flag is referred to in said network information table, and
wherein said descriptor comprises a terrestrial delivery system descriptor, and said bit flag is contained in said terrestrial delivery system descriptor.

17. A method, comprising:
transmitting a hierarchical digital broadcast transmission,
transmitting a signalling table comprising a descriptor of the digital broadcast transmission, wherein said descriptor is configured to indicate a priority of a transport stream of said hierarchical digital broadcast transmission, and
providing information on how said priority is adapted to be mapped to said transport stream of said digital broadcast transmission,
wherein said signalling table is configured to identify said transport stream, and said descriptor is configured to identify said priority of said transport stream so that said priority of said transport stream can be identified at a receiver so as to select the transport stream in accordance with said priority, wherein said descriptor comprises a terrestrial delivery system descriptor, and wherein a priority flag of said terrestrial delivery system descriptor identifies said priority.

18. A method, comprising:

receiving a hierarchical digital broadcast transmission, receiving a signaling table comprising a descriptor of the digital broadcast transmission, wherein said descriptor is configured to indicate a priority of a transport stream of said hierarchical digital broadcast transmission, obtaining information on how said priority is adapted to be mapped to said transport stream of said hierarchical digital broadcast transmission, wherein said signaling table is configured to identify said transport stream, and said descriptor is configured to identify said priority of said transport stream so that said priority of said transport stream can be identified, identifying said priority, and selecting the transport stream in accordance with said priority, wherein said descriptor comprises a terrestrial delivery system descriptor, and wherein a priority flag of said terrestrial delivery system descriptor identifies said priority.

19. The method according to claim 18, wherein a transport stream id and an original network id uniquely identify said transport stream.

20. A memory having stored thereon computer program code that, when executed by a processor, causes an apparatus to:

receive a digital broadcast transmission applying a hierarchical modulation, receive a signalling table comprising a descriptor of the digital broadcast transmission, wherein said descriptor is configured to indicate how a hierarchical priority is configured to be mapped to a transport stream carried in said digital broadcast transmission, obtain information on how said hierarchical priority is configured to be mapped to said transport stream carried in said digital broadcast transmission, wherein said signalling table is configured to identify said transport stream, and said descriptor is configured to identify said hierarchical priority of said transport stream so that said hierarchical priority of said transport stream can be identified, identify said hierarchical priority, select the transport stream in accordance with said hierarchical priority, parse information identifying said transport stream, parse information identifying said hierarchical priority, and link the parsed information so as to map said transport stream into said priority.

21. The memory as claimed in claim 20 embodied as a non-transitory computer readable medium.

22. An apparatus comprising:

a module configured to transmit a digital broadcast transmission applying a hierarchical modulation, a module configured to transmit a signalling table comprising a descriptor of the digital broadcast transmission, a module configured to provide information identifying a transport stream carried in said digital broadcast transmission for parsing at a receiver, a module configured to provide information identifying a hierarchical priority for parsing at said receiver, wherein said descriptor is configured to indicate how said hierarchical priority is configured to be mapped into said transport stream, and a memory configured to store information on how said hierarchical priority is configured to be mapped into said transport stream carried in said digital broadcast transmission, wherein said signalling table is configured to identify said transport stream, and said descriptor is configured to identify said hierarchical priority of said transport stream so that said hierarchical priority of said transport stream can be identified at said receiver so as to select the transport stream in accordance with said hierarchical priority.

23. An apparatus comprising:

a processor, and memory storing computer program code that, when executed by the processor, cause the apparatus to:

receive a digital broadcast transmission applying a hierarchical modulation, receive a network information table comprising a descriptor of the digital broadcast transmission indicating how a hierarchical priority is configured to be mapped into a transport stream carried in said digital broadcast transmission, store information on how said hierarchical priority is configured to be mapped to said transport stream carried in said digital broadcast transmission, identify said hierarchical priority, and select the transport stream in accordance with said hierarchical priority, wherein said network information table is configured to identify said transport stream, and said descriptor is configured to identify said hierarchical priority of said transport stream so that said hierarchical priority of said transport stream can be identified, and wherein said descriptor comprises a bit flag indicating a value of said hierarchical priority, and wherein said bit flag is contained in service information of said digital broadcast transmission, and wherein said service information comprises the network information table and said bit flag is referred to in said network information table, and wherein said descriptor comprises a terrestrial delivery system descriptor, and said bit flag is contained in said terrestrial delivery system descriptor.

24. The apparatus according to claim 23, wherein the apparatus comprises a mobile receiver.

25. The apparatus according to claim 24, wherein the apparatus comprises a mobile DVB-T receiver.

26. The apparatus according to claim 25, wherein the apparatus further comprises a mobile station for interaction.

27. A method comprising:

incorporating at least two separate data transmissions into a single digital broadcast transmission, providing information on how a level of organization in the incorporated single digital broadcast transmission is mapped into a transport stream carried in a digital broadcast transmission, providing information on how a hierarchical priority is configured to be mapped into said transport stream carried in said digital broadcast transmission, and transmitting a signaling table comprising a descriptor of said digital broadcast transmission, wherein said signalling table is configured to identify said transport stream, and said descriptor is configured to identify said level of organization of said transport stream so that said level of organization of said transport stream can be identified at a receiver so as to select the transport stream in accordance with said level of organization, wherein said descriptor comprises a terrestrial delivery system descriptor, and wherein a priority flag of said terrestrial delivery system descriptor identifies said hierarchical priority.

* * * * *